UNITED STATES PATENT OFFICE.

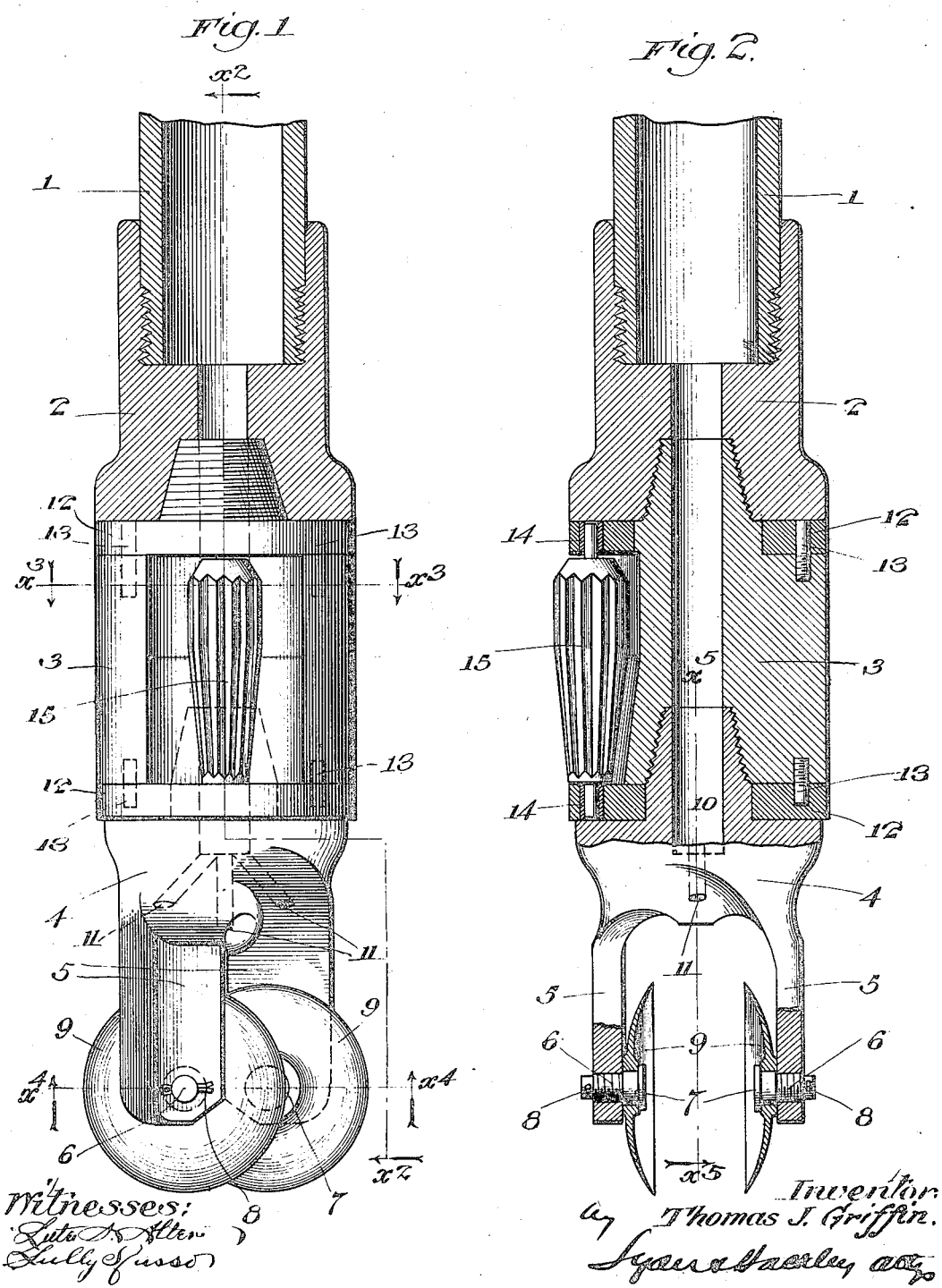

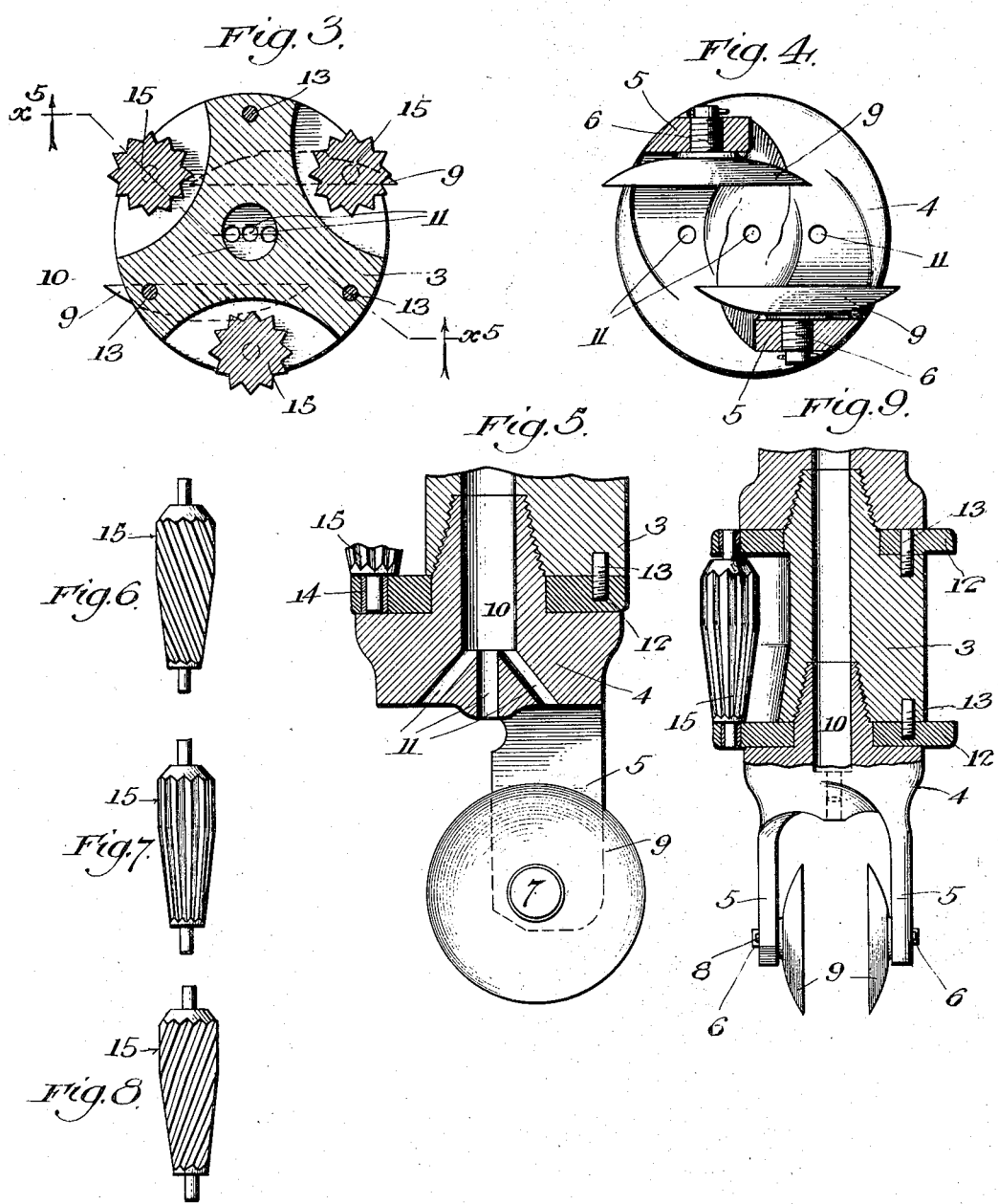

THOMAS J. GRIFFIN, OF LOS ANGELES, CALIFORNIA, ASSIGNOR, BY MESNE ASSIGNMENTS, TO SHARP-HUGHES TOOL COMPANY, OF HOUSTON, TEXAS, A CORPORATION OF TEXAS.

ROTARY BORING-DRILL.

1,174,568.     Specification of Letters Patent.     Patented Mar. 7, 1916.

Application filed June 11, 1913. Serial No. 773,033.

*To all whom it may concern:*

Be it known that I, THOMAS J. GRIFFIN, a citizen of the United States, residing at Los Angeles, in the county of Los Angeles and State of California, have invented a new and useful Rotary Boring-Drill, of which the following is a specification.

This invention relates to rotary boring drills, and has for its main object to provide a reaming drill of novel construction.

Figure 1 of the drawings is a side elevational view partly in vertical section of a drill constructed in accordance with my invention. Fig. 2 is a vertical sectional view taken on the line $x^2$—$x^2$ of Fig. 1. Fig. 3 is a horizontal cross-sectional view taken on the line $x^3$—$x^3$ of Fig. 1. Fig. 4 is a horizontal cross-sectional view taken on the line $x^4$—$x^4$ of Fig. 1. Fig. 5 is a longitudinal vertical-sectional view taken on the line $x^5$—$x^5$ of Figs. 2 and 3. Figs 6, 7 and 8 are side elevational views of the vertically-disposed cutters at the upper end of the head of the drill; and Fig. 9 is a longitudinal sectional view, illustrating the manner of changing the position of the vertically-disposed cutters at the upper end of the drill head when it is desired to change the dimensions of the hole.

Referring to the drawings, which illustrate the preferred form of my invention, 1 designates a hollow drill stem to which the head of the drill is detachably connected. The head of the drill is preferably formed in sections and consists of three members 2, 3 and 4 that are detachably connected together in any suitable manner, preferably, however, by means of externally screw-threaded, tapered portions on said members that fit in coöperating internally screw-threaded, tapered sockets.

The member 4 that constitutes the lower portion of the head is provided with a pair of spaced legs 5 that are staggered or offset slightly with relation to each other, and each of said legs is equipped with a substantially disk-shaped cutter 9 arranged on the inner side of same, as shown in Fig. 2. The cutters 9 of the drill herein shown are concavo-convex shaped and are provided with sharp shearing edges, although various other types of disk-shaped cutters can be used successfully without departing from the spirit of my invention. The disk-shaped cutters 9 are arranged parallel to each other, as shown in Fig. 4, and as they are offset or slightly staggered with relation to each other, the rear edges of same will not drag against the side wall of the hole when the advancing edges of the cutters are shearing off the material from the side wall of the hole and digging into the material at the bottom of the hole. The cutters 9 can be mounted on the legs 5 in any suitable manner, but I prefer to mount each cutter on a short spindle 6 that is screwed into the inner side of the leg and locked in position by means of a cotter pin 8 that passes transversely through the outer end of the spindle at a point outside of the leg 5. At the inner end of the spindle is a head 7 that retains the cutter in position and prevents it from moving longitudinally of the spindle. The head of the drill is provided with a center water course or passage-way 10 and with a plurality of branches 11, as shown in Figs. 1 and 2, from which jets of flushing water are discharged downwardly between the cutters 9 and also laterally toward the side wall of the hole, thereby effectively preventing the disintegrated material from becoming packed in the space between the cutters 9, and thus interfering with or preventing said cutters from rotating.

Adjacent the upper end of the head of the drill is a plurality of upright or vertically-disposed cutters 15 which remove the material from the side wall of the hole, said cutters 15 preferably consisting of longitudinally-tapered members that are rotatably mounted in the head. When the drill is in operation the cutters 15 progressively increase the diameter of the hole as the head of the drill descends, and they consequently prevent the drill from losing its clearance in case the sharp edges of the disk-shaped cutters 9 becomes excessively worn. It is immaterial, so far as my broad idea is concerned, how the vertically-disposed cutters 15 are mounted on the head of the drill, but in the drill herein shown said cutters are rotatably mounted in removable bearing rings 12 that are clamped between the coöperating members 2, 3 and 4 that constitute the head of the drill, each of said cutters being provided at its opposite ends with trunnions that fit in bushings 14 in the rings 12. Rotary movement of the rings 12 with relation to the head of the drill is prevented by means of dowel pins 13 on the intermediate member 3 of the drill head. In order to eliminate the possibility of the cutters 15 tracking I prefer to provide said cutters with cutting surfaces of different character. For example, one of the cutters 15 may be provided with inclined cutting teeth that extend spirally around the cutter, as shown in Fig. 6, one of the other cutters can be provided with straight chisel teeth that extend longitudinally of same, as shown in Fig. 7, and the other cutter can be provided with inclined chisel teeth that extend spirally around same in the opposite direction, as shown in Fig. 8.

In view of the fact that the rings 12 that support the cutters 15 are removable, it is possible to change the position of the cutters 15 so as to vary the diameter of the hole that is to be formed by substituting rings 12 that will position the cutters 15 nearer to or farther away from the vertical center of the head of the drill. It is also possible with such a construction to vary the size of the cutters 15 and substitute large for small cutters without changing the construction of the drill head, except substituting large for small rings 12.

Having thus described my invention, what I claim, and desire to secure by Letters Patent, is:

1. A rotary boring drill, comprising a head composed of a top member, a bottom member and an intermediate member, a cutting means carried by said bottom member, rings clamped between said intermediate member and said top and bottom members, longitudinally-tapered cutters arranged vertically in pockets formed in the intermediate member of the head, and devices that coöperate with said rings to hold said cutters in position.

2. A rotary boring drill, comprising a head composed of a top member, a bottom member and an intermediate member, externally screw-threaded, tapered portions and coöperating sockets on said members that join them together, rings clamped between said intermediate member and said top and bottom members, means for preventing said rings from rotating relatively to the head, a cutting means carried by the bottom member of the head, and vertically-disposed, longitudinally-tapered cutters arranged between said rings and provided with trunnions that are journaled in the rings.

In testimony whereof, I have hereunto set my hand at Los Angeles, California this 5th day of June, 1913.

THOMAS J. GRIFFIN.

In presence of—
GEORGE T. HACKLEY,
MARTHA M. LANGE.